(12) United States Patent
Fukunaga et al.

(10) Patent No.: US 8,685,571 B2
(45) Date of Patent: Apr. 1, 2014

(54) METHOD FOR PRODUCING SEPARATOR, METHOD FOR PRODUCING MOLTEN SALT BATTERY, SEPARATOR, AND MOLTEN SALT BATTERY

(75) Inventors: Atsushi Fukunaga, Osaka (JP); Shoichiro Sakai, Osaka (JP); Chihiro Hiraiwa, Osaka (JP); Koji Nitta, Osaka (JP); Masatoshi Majima, Osaka (JP); Shinji Inazawa, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/252,295

(22) Filed: Oct. 4, 2011

(65) Prior Publication Data

US 2012/0208068 A1 Aug. 16, 2012

Related U.S. Application Data

(63) Continuation of application No. PCT/JP2011/058714, filed on Apr. 6, 2011.

(30) Foreign Application Priority Data

Apr. 6, 2010 (JP) .................................. 2010-088023

(51) Int. Cl.
*H01M 2/14* (2006.01)
*H01M 2/16* (2006.01)

(52) U.S. Cl.
USPC .......................... 429/249; 429/144; 429/246

(58) Field of Classification Search
USPC .......................... 429/231, 223, 224, 144, 246
See application file for complete search history.

(56) References Cited

U.S. PATENT DOCUMENTS

| | | | |
|---|---|---|---|
| 3,837,819 A | 9/1974 | Hibbs, Jr. | |
| 5,143,802 A | 9/1992 | Wright | |
| 5,290,645 A * | 3/1994 | Tanaka et al. | ................. 429/144 |
| 5,830,603 A | 11/1998 | Oka et al. | |

(Continued)

FOREIGN PATENT DOCUMENTS

| | | |
|---|---|---|
| JP | 02-040866 A | 2/1990 |
| JP | 06-283213 A | 10/1994 |

(Continued)

OTHER PUBLICATIONS

Machine Translation of Nakagawa et al. (JP 2002-324579, Published Nov. 8, 2002).*

(Continued)

*Primary Examiner* — Basia Ridley
*Assistant Examiner* — Caitlin Wilmot
(74) *Attorney, Agent, or Firm* — Ditthavong Mori & Steiner, P.C.

(57) ABSTRACT

A separator of a molten salt battery made of a porous resin sheet. The separator is improved in wettability to a molten salt by giving hydrophilicity to the resin sheet. In the case of a fluororesin sheet, the sheet is impregnated with water, and irradiated with ultraviolet rays so that C—F bonds in the fluororesin are cleaved and the resultant reacts with water to generate hydrophilic groups, such as OH groups, in each surface layer thereof. The separator gains hydrophilicity through the hydrophilic groups. The separator made of the resin can be made into a bag form. In a molten salt battery having the bag-form separator, the growth of a dendrite is prevented.

19 Claims, 10 Drawing Sheets

(56) References Cited

U.S. PATENT DOCUMENTS

| | | | |
|---|---|---|---|
| 6,392,413 B2* | 5/2002 | Onishi et al. | 324/429 |
| 2002/0018626 A1 | 2/2002 | Muller et al. | |
| 2004/0166412 A1 | 8/2004 | Bugnet et al. | |
| 2005/0067296 A1 | 3/2005 | Linde et al. | |
| 2006/0083986 A1 | 4/2006 | Li et al. | |
| 2007/0231693 A1* | 10/2007 | Inagaki et al. | 429/231.1 |
| 2007/0281206 A1 | 12/2007 | Fujikawa et al. | |
| 2009/0197175 A1* | 8/2009 | Nagai et al. | 429/231.1 |
| 2009/0212743 A1 | 8/2009 | Hagiwara et al. | |
| 2010/0178555 A1 | 7/2010 | Best | |

FOREIGN PATENT DOCUMENTS

| | | | |
|---|---|---|---|
| JP | 06-295717 A | 10/1994 | |
| JP | 07-022066 A | 1/1995 | |
| JP | 07-122257 A | 5/1995 | |
| JP | 07-153492 A | 6/1995 | |
| JP | 07-161349 A | 6/1995 | |
| JP | 07-230822 A | 8/1995 | |
| JP | 07-245122 A | 9/1995 | |
| JP | 08-078051 A | 3/1996 | |
| JP | 08-138761 A | 5/1996 | |
| JP | H08-138761 A | 5/1996 | |
| JP | 09-167631 A | 6/1997 | |
| JP | H09-167631 A | 6/1997 | |
| JP | 09-251866 A | 9/1997 | |
| JP | 09-320637 A | 12/1997 | |
| JP | 10-040952 A | 2/1998 | |
| JP | 10-312791 A | 11/1998 | |
| JP | 2916023 B2 | 4/1999 | |
| JP | 11-306859 A | 11/1999 | |
| JP | 11-339852 A | 12/1999 | |
| JP | 2002-324579 A | 11/2002 | |
| JP | 2004-022306 A | 1/2004 | |
| JP | 2004-319457 A | 11/2004 | |
| JP | 2005-149977 A | 6/2005 | |
| JP | 2006-059712 A | 3/2006 | |
| JP | 2007-194037 A | 8/2007 | |
| JP | 2008-501214 A | 1/2008 | |
| JP | 2008-511967 A | 4/2008 | |
| JP | 2008-226488 A | 9/2008 | |
| JP | 2010-212099 A | 9/2010 | |
| WO | WO 2011/036907 A1 | 3/2011 | |

OTHER PUBLICATIONS

Office Action for related U.S. Appl. No. 13/252,289 dated Jun. 21, 2012, pp. 1-54.
International Search Report for PCT Application No. PCT/JP2011/055107 dated May 17, 2011, pp. 1-5.
International Search Report for PCT Application No. PCT/JP2011/058714 dated Jul. 19, 2011, pp. 1-9.
International Search Report for PCT Application No. PCT/JP2011/058966 dated Jul. 12, 2011, pp. 1-5.
International Search Report for PCT Application No. PCT/JP2011/061610 dated Aug. 30, 2011, pp. 1-5.
Komaba, S., et al., "Electrochemical Na Insertion and Solid Electrolyte Interphase for Hard-Carbon Electrodes and Application to Na-Ion Batteries", Advanced Functional Materials, 2011, Wiley-VCH Verlag GmbH & Co. KGaA, Weinheim, Germany, pp. 1-9.
Komaba, S., et al., "Study on Na-Ion Batteries: Electrode Materials, Electrolytes, and Solid Electrolyte Interphase", Dept. of Applied Chem., Tokyo Univ. of Science, Shinjuki, Dec. 2, 2010, Tokyo, Japan, pp. 1-8, with Eng. abstract.
Final Rejection for related U.S. Appl. No. 13/252,298 dated Sep. 13, 2012, pp. 1-16.
Final Rejection for related U.S. Appl. No. 13/252,290 dated Jan. 7, 2013, pp. 1-32.
Office Action for related U.S. Appl. No. 13/252,290 dated Sep. 20, 2012, pp. 1-22.

* cited by examiner

FIG. 8

| UV RADIATING PERIOD (minutes) | WETTABILITY TO MOLTEN SALT | SHORT CIRCUIT PRESSURE (Pa) | ELEMENTAL RATIO (atomic %) OF F | ELEMENTAL RATIO (atomic %) OF O |
|---|---|---|---|---|
| 0 | ENTIRE SURFACE IS NOT IMPREGNATED | $14 \times 10^6$ | 66.9 | 0.1 |
| 5 | 100 seconds | $8 \times 10^6$ | 63.4 | 1.1 |
| 8 | 5 seconds | $9 \times 10^6$ | 56.4 | 3.3 |
| 10 | 3 seconds | $6 \times 10^6$ | 55.0 | 6.1 |
| 20 | 3 seconds | $1 \times 10^6$ | 45.1 | 15.4 |

METHOD FOR PRODUCING SEPARATOR, METHOD FOR PRODUCING MOLTEN SALT BATTERY, SEPARATOR, AND MOLTEN SALT BATTERY

TECHNICAL FIELD

The present invention relates to a molten salt battery using a molten salt as an electrolyte, and particularly to a method for producing a separator having endurance, a method for producing a molten salt battery, a separator, and a molten salt battery.

BACKGROUND ART

In recent years, the use of natural energies of sunlight, wind power, and others has been advanced. When electric power is generated by use of a natural energy, the electric power generation amount is easily varied because of a change in natural conditions, such as weather, and further the electric power generation amount is not easily adjusted in accordance with electric power demand. Accordingly, in order to supply the electric power generated by use of a natural energy, it is necessary to level the supply power by charging and discharging through the use of a storage battery. In order to attain further promotion of the use of natural energies, storage batteries high in energy density and efficiency are indispensable.

CITATION LIST

Patent Literature
Patent Literature 1: Japanese Unexamined Patent Publication No. 7-122257

SUMMARY OF INVENTION

Technical Problem

As storage batteries high in energy density and efficiency, attention is paid to molten salt batteries. Molten salt batteries are each a battery using a molten salt as an electrolyte. The battery operates in the state that the molten salt is molten. While the molten salt battery operates, the temperature of the inside of the molten salt battery is kept at a temperature not lower than the melting point of the molten salt. The molten salt battery has therein a positive electrode, a negative electrode, and a separator. The separator is a member, in a sheet form, for separating the positive electrode and the negative electrode from each other, and holds therein a molten salt containing ions. In molten salt batteries in the prior art, as their separator, a nonwoven fabric of glass fiber (hereinafter referred to as a glass nonwoven fabric) is frequency used, which can hold therein a molten salt.

Any glass nonwoven fabric is weak in tensile force, and is unable to be plastically deformed; thus, the fabric is low in strength against bending or other workings to be poor in workability. Accordingly, when a separator using a glass nonwoven fabric is bent, the separator is easily broken. The broken separator cannot inhibit, when a dendrite is generated in electrodes of the molten salt battery, the growth of the dendrite so that the molten salt battery may be short-circuited. In order to prevent the short circuit, it is necessary to make the separator thick. As a result, there is caused a problem that the molten salt battery becomes large in internal resistance to be deteriorated in performance. In lithium ion batteries, general use is made of a resin sheet made of a polyolefin resin as their separator. However, it is presumed that lithium ion batteries are used at room temperature. A separator using an ordinary resin is not easily used for any molten salt battery since the separator is easily softened at a high temperature not lower than the melting point of the molten salt.

A fluororesin such as PTFE (polytetrafluoroethylene) is conceivable as a separator material that is good in workability, is less easily broken, and is high in heat resistance so that a separator made therefrom is usable at a high temperature not lower than the melting point of a molten salt. However, in a molten salt battery using, as an electrolyte, for example, a molten salt such as NaFSA, wherein a sodium ion is used as a cation and FSA (bisfluorosulfonylamide: $(FSO_2)N^-$) is used as an anion, the inside of a separator made of a fluororesin is not easily impregnated with the molten salt to result in a problem that the operation of the battery becomes unstable. This problem is caused by a matter that the molten salt is poor in wettability to any fluororesin. A separator using a fluororesin does not easily hold a molten salt that is an electrolyte. Thus, it is difficult that the separator is used in a molten salt battery. Although Patent Literature 1 discloses a method of improving the hydrophilicity of PTFE or some other resin, the literature never discloses any method of improving the wettability of the resin to molten salts.

The present invention has been made in light of this situation, and an object thereof is to provide a method for producing a separator that is usable in a molten salt battery and is not easily broken by the use of a resin improved in wettability to a molten salt, a method for producing a molten salt battery, a separator, and a molten salt battery having this separator.

Solution to Problems

The method for producing a separator according to the present invention is a method for producing a separator in a sheet form for separating paired electrodes from each other in a molten salt battery using a molten salt as an electrolyte, wherein hydrophilicity is given to a porous resin sheet containing, as a raw material thereof, a resin resistant against the molten salt.

The method for producing a separator according to the present invention is the method wherein the resin sheet is a fluororesin sheet, in the state that the fluororesin sheet is impregnated with water, the fluororesin sheet is irradiated with ultraviolet rays having an energy not less than an energy necessary for cleaving C—F bonds in the fluororesin to substitute F groups exposed to each surface of the fluororesin sheet with oxygen-containing groups, thereby setting the elemental ratio of oxygen present in a layer of the surface of the fluororesin sheet into the range of 1 atomic percent or more and 15 atomic percent or less.

The method for producing a separator according to the present invention is the method wherein before the fluororesin sheet is impregnated with the water, the fluororesin sheet is immersed in a hydrophilic organic solvent.

The method for producing a separator according to the present invention is the method wherein the amount of the F groups to be substituted with the oxygen-containing groups is adjusted in such a manner that when the separator is sandwiched between the paired electrodes and a pressure is applied to the separator in the thickness direction of the sheet until the paired electrodes are short-circuited, the pressure turns to $1 \times 10^6$ Pa or more at the time of the short circuit.

The method for producing a separator according to the present invention is the method wherein a layer made from polyvinyl alcohol is formed over the surface of the resin sheet.

The method for producing a separator according to the present invention is the method wherein the resin is polypropylene.

The method for producing a separator according to the present invention is the method wherein the sheet to which hydrophilicity is given, and a sheet entirely equivalent thereto are put onto each other, and their circumferential edges are joined to each other except some portions, thereby forming the sheets into a bag form.

The method according to the present invention for producing a molten salt battery includes: fabricating the molten salt battery in the state that electrodes thereof are separated from each other by a separator produced by the method for producing a separator according to the present invention.

The separator according to the present invention is a separator in a sheet form for separating paired electrodes from each other in a molten salt battery using a molten salt as an electrolyte, the separator being a porous resin sheet containing, as a raw material thereof, a resin resistant against the molten salt, and hydrophilicity being given to the porous resin sheet.

The separator according to the present invention is the separator wherein the resin sheet is a fluororesin sheet, oxygen-containing groups are present in each surface layer of the sheet, and the elemental ratio of oxygen present in the surface layer is 1 atomic percent or more and 15 atomic percent or less.

The separator according to the present invention is the separator wherein when the separator is sandwiched between the paired electrodes and a pressure is applied to the separator in the thickness direction of the sheet until the paired electrodes are short-circuited, the pressure is $1\times10^6$ Pa or more at the time of the short circuit.

The separator according to the present invention is the separator wherein the resin is a fluororesin or polypropylene, and a layer made from polyvinyl alcohol is formed over each surface of the separator.

The separator according to the present invention is the separator which is partially opened to be made into a bag form.

The molten salt battery according to the present invention is a molten salt battery using a molten salt as an electrolyte, the battery including a separator that is a porous resin sheet containing, as a raw material thereof, a resin resistant against the molten salt, and the separator being impregnated with the molten salt.

The molten salt battery according to the present invention includes the separator according to the present invention.

The molten salt battery according to the present invention is the molten salt battery wherein the separator is partially opened to be made into a bag form.

The molten salt battery according to the present invention is the molten salt battery including plural positive electrodes and negative electrodes each made into a plate form, the separator being a continuous separator folded plural times, and the positive electrodes and the negative electrodes being alternately arranged to sandwich a folded portion of the separator between any adjacent two of the positive electrodes and the negative electrodes.

In the present invention, the molten salt battery thereof has a separator that is a porous resin sheet. The resin sheet is less easily broken than any glass nonwoven fabric and is less easily scratched. It is therefore difficult that a dendrite generated in its electrodes penetrates the separator. Thus, the molten salt battery is effectively restrained from being short-circuited by the dendrite.

In the present invention, hydrophilicity is given to the separator, which is the porous resin sheet, thereby improving the separator in wettability to the molten salt. Thus, the separator is easily impregnated with the molten salt.

In the present invention, ultraviolet rays are radiated onto a fluororesin sheet impregnated with water, whereby C—F bonds are cleaved in the fluororesin sheet, and further water reacts therewith so that oxygen-containing groups such as OH groups are generated. For this reason, F groups in each surface layer of the fluororesin sheet are substituted with the oxygen-containing groups. The ultraviolet rays are radiated to set the elemental ratio of oxygen present in the surface layer of the fluororesin sheet into the range of 1% or more and 15% or less, thereby improving the fluororesin sheet in wettability to the molten salt. Thus, the resultant is usable as a separator.

In the present invention, the fluororesin sheet is immersed in a hydrophilic organic solvent such as ethanol, and then the fluororesin sheet is impregnated with water. The hydrophilic organic solvent is easily substituted with water, so that the impregnation of the fluororesin sheet with water is easily attained.

In the present invention, when a pressure is applied to the separator in the thickness direction of the fluororesin sheet, the irradiance of the ultraviolet rays is adjusted to set the short circuit pressure to $1\times10^6$ Pa or more. In this way, the fluororesin sheet can keep a strength permitting the fluororesin sheet to be used as a separator of a molten salt battery.

In the present invention, a layer made from polyvinyl alcohol is formed over the surface of the resin sheet, thereby giving hydrophilicity to the resin sheet.

In the present invention, the molten salt battery thereof makes use of polypropylene, which has resistance against the molten salt at temperatures at which the molten salt battery operates, as the resin that is the raw material of the separator.

In the present invention, the separator is made into a bag form, and the positive electrode or the negative electrode of the molten salt battery is wrapped with the bag-form separator. Inside the molten salt battery, the separator is constantly present between the positive electrode and the negative electrode.

In the present invention, the molten salt battery includes plural positive electrodes and negative electrodes each made into a plate form, the separator is a continuous separator folded plural times, and the positive electrodes and the negative electrodes are alternately arranged to sandwich or interpose a folded portion of the separator between any adjacent two of the positive electrodes and the negative electrodes. The molten salt battery has a structure equivalent to that of a circuit wherein plural batteries are connected to each other in parallel.

Advantageous Effects of Invention

In the present invention, the raw material of the separator of a molten salt battery is rendered a resin, whereby the molten salt battery produces advantageous effects including the following: the molten salt battery is lower in the risk of being short-circuited to be safer than conventional molten salt batteries using, as their separator, a glass nonwoven fabric; and a molten salt battery giving a lowered internal resistance to be improved in power can be realized.

BRIEF DESCRIPTION OF DRAWINGS

FIG. 8 is a table showing comparative results between elemental ratios in a surface layer of the separator, and the strength of the separator as well as the wettability of the separator to a molten salt.

DESCRIPTION OF EMBODIMENTS

Hereinafter, the present invention will be specifically described by way of embodiments with reference to the drawings.

Embodiment 1

Figure 1:
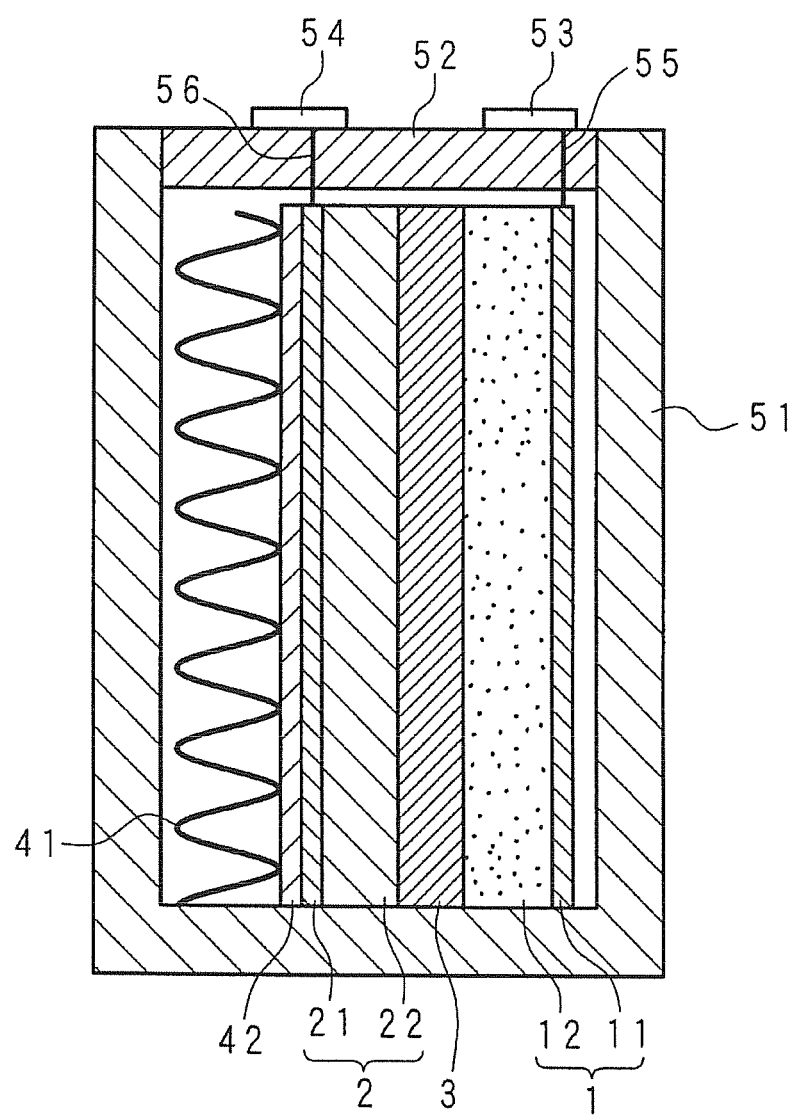
FIG. 1 is a schematic sectional view illustrating a structural example of a molten salt battery according to Embodiment 1 of the present invention.

FIG. 1 is a schematic sectional view illustrating a structural example of a molten salt battery according to Embodiment 1 of the present invention. In FIG. 1, the illustrated schematic sectional view is one obtained by cutting the molten salt battery vertically. The molten salt battery has the following structure: inside a battery case 51 in the form of a rectangular parallelepiped box having an opened upper surface, a positive electrode 1 in the form of a rectangular plate, a separator 3 in a sheet form, and a negative electrode 2 in the form of a rectangular plate are arranged in parallel, and a lid section 52 is capped to the battery case 51. The battery case 51 and the lid section 52 are made of Al (aluminum). The positive electrode 1 and the negative electrode 2 are each made into a flat rectangular plate form, and the separator 3 is made into a sheet form. The separator 3 is interposed between the positive electrode 1 and the negative electrode 2. The positive electrode 1, the separator 3 and the negative electrode 2 are stacked, and arranged perpendicularly to the bottom surface of the battery case 51.

Between the negative electrode 2 and an inner wall of the battery case 51, a spring 41 is arranged which is a made of a metal in a waved plate form. The spring 41 is made of an Al alloy, and urges a flat-plate-form holding plate 42 having no flexibility to press the negative electrode 2 toward the separator 3 and the positive electrode 1. By the reaction of the spring 41, the positive electrode 1 is pressed toward the separator 3 and the negative electrode 2 from an inner wall at the opposed side of the spring 41. The spring 41 is not limited to a spring made of any metal, and may be, for example, an elastomer such as rubber. When the positive electrode 1 or the negative electrode 2 is swelled or shrunken by charging and/or discharging the battery, the spring 41 stretches or shrinks so that a change in the volume of the positive electrode 1 or the negative electrode 2 is absorbed.

The positive electrode 1 is formed by painting a positive electrode material 12 containing a positive electrode active material, such as $NaCrO_2$, and a binder onto a current collector 11 of the positive electrode that is in a rectangular plate form and made of Al. The positive electrode active material is not limited to $NaCrO_2$. The negative electrode 2 is formed by depositing, by plating, a negative electrode material 22 containing a negative electrode active material, such as Sn (tin), onto a current collector 21 of the negative electrode that is in a rectangular plate form and made of Al. When the negative electrode material 22 is deposited onto the current collector 21 of the negative electrode by the plating, an underlying layer is deposited by plating with zinc for a zincate treatment and subsequently the underlying layer is plated with Sn. The negative electrode active material is not limited to Sn. Thus, Sn may be substituted with, for example, metallic sodium, carbon, silicon or indium. The negative electrode material 22 may be formed, for example, by incorporating a binder into a powder of the negative electrode active material, and then painting the resultant onto the current collector 21 of the negative electrode. The current collector 11 of the positive electrode and the current collector 21 of the negative electrode are not limited to aluminum, and may be, for example, stainless steel. Details of the separator 3 will be described later.

Inside the battery case 51, the positive electrode material 12 of the positive electrode 1 and the negative electrode material 22 of the negative electrode 2 face each other, and the separator 3 is interposed between the positive electrode 1 and the negative electrode 2. The positive electrode 1, the negative electrode 2 and the separator 3 are impregnated with an electrolyte made of a molten salt. Any inner surface of the battery case 51 has an insulating structure by being coated with an insulating resin, or by some other method in order to prevent short circuit between the positive electrode 1 and the negative electrode 2. At the external side of the lid section 52, a positive electrode terminal 53 and a negative electrode terminal 54 are set for being connected to the outside. The positive electrode terminal 53 and the negative electrode terminal 54 are electrically insulated from each other. The region of the lid section 52 facing the inside of the battery case 51 is also electrically insulated with an insulating film or some other. One end of the current collector 11 of the positive electrode is connected to the positive electrode terminal 53 through a lead wire 55, and one end of the current collector 21 of the negative electrode is connected to the negative electrode terminal 54 through a lead wire 56. The lead wire 55 and the lead wire 56 are electrically insulated from the lid section 52. The lid section 52 is capped to the battery case 51 by welding.

The electrolyte is a molten salt that is a conductive liquid in a molten state. The molten salt is molten at temperatures not lower than the melting point of the molten salt to turn an electrolyte, so that the molten salt battery functions as a secondary battery. In order to lower the melting point, it is desired that the electrolyte is a mixture of plural molten salt species. The electrolyte is, for example, a mixed salt of NaFSA, wherein a sodium ion and FSA are a cation and an anion, respectively, and KFSA, wherein a potassium ion and FSA are a cation and an anion, respectively. This mixed salt will be referred to as Na-KFSA hereinafter. The molten salt, which is the electrolyte, may contain a different anion, such as TFSA (bistrifluoromethylsulfonylamide) or FTA (fluorotrifluoromethylsulfonylamide), or may contain a different cation, such as an organic ion. The molten salt may contain an ionic liquid that is molten at room temperature. In this form, the sodium ion in the electrolyte functions as a carrier for electric charges. The structure of the molten salt battery illustrated in FIG. 1 is a schematic structure, and the molten salt battery may contain therein any other structural member not illustrated, such as a heater for heating the inside of the battery, or a temperature sensor.

The following will describe the separator 3 in detail. The separator 3 is a resin sheet containing, as a raw material thereof, a resin having resistance against the molten salt at temperatures at which the molten salt battery operates in the state that the molten salt is molten. In the present embodiment, the separator 3 is made of PTFE, which is a fluororesin, and is formed into a porous sheet form. PTFE is not thermally decomposed at temperatures not lower than the melting point of the molten salt, which are operating temperatures of the molten salt battery. Furthermore, PTFE has resistance against the molten salt at temperatures not lower than the melting point of the molten salt. Usually, PTFE is poor in wettability to any molten salt. However, the inventors' experiments have demonstrated that by causing the resin to have hydrophilicity, the wettability of the resin to any molten salt is improved. Thus, hydrophilicity is given to the separator 3, thereby improving the wettability to the molten salt. In the method of the present invention for producing a separator, F groups (fluoro groups) exposed to each surface of a porous PTFE sheet (fluororesin sheet) are partially substituted with oxygen-containing hydrophilic groups such as OH groups (hydroxyl groups), thereby producing the separator 3. Specifically, a porous PTFE sheet is impregnated with water. Next, the PTFE sheet is irradiated with UVs (ultraviolet rays) having an energy not less than an energy necessary for cleaving C—F bonds in the fluororesin, thereby producing the separator 3. F, O, H and C represent fluorine, oxygen, hydrogen, and carbon, respectively.

Figure 2:
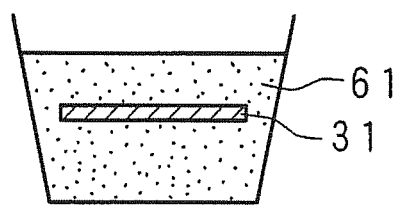
FIG. 2 is a schematic sectional view illustrating a process for impregnating a porous PTFE sheet with water.
Figure 2:
Figure 2:
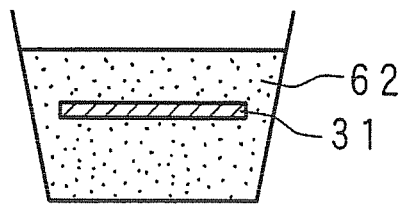

FIG. 2 is a schematic sectional view illustrating a process for impregnating a porous PTFE sheet with water. First, the sheet, which is a porous PTFE sheet 31, is immersed in ethanol 61. Ethanol 61 is a hydrophilic organic solvent. The inside of the porous PTFE sheet 31 immersed in ethanol 61 is impregnated with ethanol. Next, the porous PTFE sheet 31 impregnated with ethanol is immersed in pure water 62. Since ethanol is satisfactorily dissolved in water, ethanol with which the inside of the porous PTFE sheet 31 is impregnated is substituted with the water, so that the inside of the porous PTFE sheet 31 is impregnated with the water. The hydrophilic organic solvent may be methanol, propanol, butanol, pentanol, hexanol, or some other. Regardless of the hydrophilic organic solvent used, the solvent produces the same advantageous effect as ethanol 61.

Figure 3:
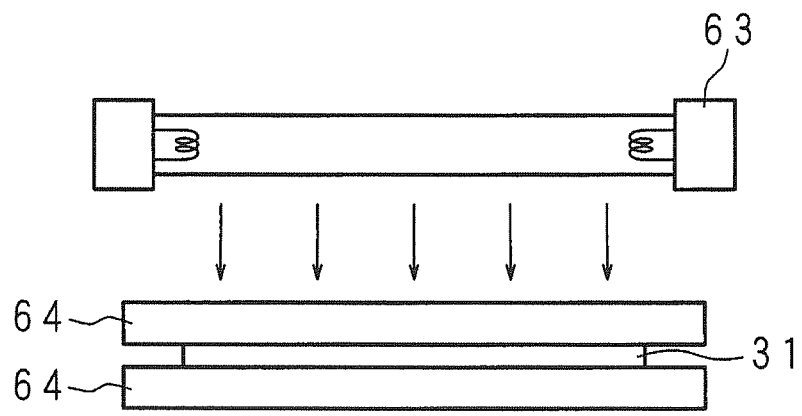
FIG. 3 is a schematic sectional view illustrating a step of irradiating the porous PTFE sheet with UVs.

FIG. 3 is a schematic sectional view illustrating a step of irradiating the porous PTFE sheet 31 with UVs. First, the porous PTFE sheet 31 impregnated with water is sandwiched between paired quartz glass plates 64 and 64. The sandwiching of the porous PTFE sheet 31 between the quartz glass plates 64 and 64 keeps a state that the inside of the porous PTFE sheet 31 is impregnated with water. Next, a low-pressure mercury lamp 63 is used to radiate UVs onto the porous PTFE sheet 31. In FIG. 3, the UVs are represented by arrows. The UVs penetrate the quartz glass plates 64 to be radiated onto the PTFE sheet 31. In order to substitute F groups in PTFE with OH groups, it is necessary to radiate UVs having an energy not less than an energy necessary for cleaving C—F bonds in PTFE. Since the binding energy of any C—F bond is 128 kcal/mol, the PTFE sheet 31 is irradiated with a UV having a wavelength of 223 nm or less, which has an energy not less than this binding energy. The radiation spectrum of the low-pressure mercury lamp 63 contains a bright line having a wavelength of 185 nm. The UV of this wavelength makes it possible to cleave the C—F bonds in PTFE. In the step of irradiating the PTFE sheet 31 with the UVs, the irradiation with the UVs is applied to both surfaces of the porous PTFE sheet 31. It is allowable to irradiate one of the surfaces of the PTFE sheet 31 with the UVs and then irradiate the other surface with the UVs, or irradiate both the surfaces of the PTFE sheet 31 simultaneously with the UVs. In the present invention, the source for radiating the UVs is not limited to the low-pressure mercury lamp 63, and may be any other UV-radiating source as far as the source is a source capable of radiating a UV having a wavelength of 223 nm or less.

Figure 4:
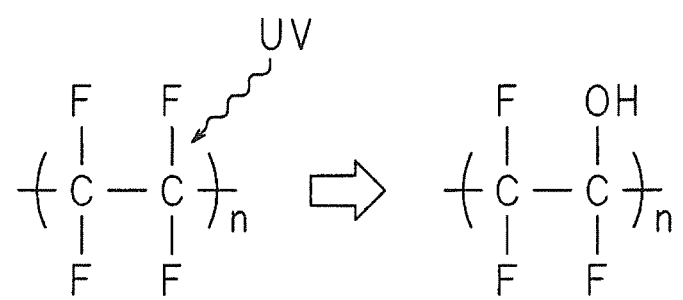
FIG. 4 is a schematic view illustrating a process in which a hydrophilic group, such as an OH group, is generated by UV radiation.

FIG. 4 is a schematic view illustrating a step of generating a hydrophilic group such as an OH group by UV radiation. In FIG. 4 is shown the structural formula of PTFE. UVs having wavelengths of 223 nm or less are radiated onto C—F bonds in any surface of the PTFE sheet 31, thereby cleaving the C—F bonds. As illustrated in FIG. 4, water contained in the PTFE sheet 31 reacts with a C atom after one of the C—F bonds is cleaved; thus, an OH group bonded to the C atom is produced. Besides the OH group, a ketone group (C=O), or a carboxylic acid group ($CO_2H$), or some other O-containing hydrophilic group may be produced. In such a way, the F groups exposed to each surface of the PTFE sheet 31 are substituted with O-containing hydrophilic groups, such as OH groups, so that the porous PTFE sheet 31 turns to the separator 3. The hydrophilic groups, such as OH groups, exposed to the surface of the separator 3 make an improvement in the compatibility between the surface of the separator 3 and polar molecules of water, the molten salt and others. As a result, the separator 3 is improved in wettability to the molten salt. As the irradiance of the UVs is larger, the amount of the hydrophilic groups, such as OH groups, becomes larger so that the separator 3 is further improved in wettability to the molten salt. However, the chemical bonds in PTFE are cleaved so that the separator 3 is declined in strength. In order to keep, with certainty, the wettability of the separator 3 to the molten salt sufficiently, it is necessary that the elemental ratio of O, which represents the proportion of O in elements present in each surface layer of the separator 3, is 1 atomic percent or more. The elemental ratio of O in the surface layer of the separator 3 corresponds to the quantity of the OH groups exposed to the surface of the separator 3. In order to keep the strength of the separator 3 sufficiently, it is necessary that the elemental ratio of O in the surface layer of the separator 3 is 15 atomic percent or less.

The following will describe a working example in which an examination was made about a relationship between the elemental ratio of O in the surface layer of the separator 3, and the strength of the separator 3 as well as the wettability thereof to the molten salt. Each of porous PTFE sheets 31 was immersed in ethanol for 1 hour, and next the PTFE sheet 31 was immersed in pure water for 5 hours to impregnate the porous PTFE sheet 31 with the water. The PTFE sheet 31 impregnated with the water was sandwiched between quartz glass plates 64 and 64. From a low-pressure mercury lamp 63 of 110 W power, UVs were radiated onto surfaces of the PTFE sheet 31 to produce the separator 3. The radiation spectrum of the low-pressure mercury lamp 63 contains bright lines having wavelengths of 185 nm and 254 nm. The distance between the low-pressure mercury lamp 63 and the surface of the PTFE sheet 31 was set to 10 mm. In the working example, the UVs were radiated to each of the surfaces of any one of the PTFE sheets 31 for 0 minute, 5 minutes, 8 minutes, 10 minutes, or minutes. In this way, five separator 3 species were produced.

Elemental ratios in the surface layer of the separator 3 were measured by use of XPS (X-ray photoelectron spectroscopy).

XPS is also called ESCA (electron spectroscopy for chemical analysis). XPS is a method of radiating an X-ray onto a sample in a vacuum, detecting photoelectrons generated from the surface of the sample, and measuring the energy of the photoelectrons, thereby the kinds of elements present in a layer of the surface of the sample, the electron states of the elements, and the relative amounts of the elements. Elements detectable by XPS are elements having a larger atomic number than that of lithium. The depth of a sample analyzable by XPS is a depth of several nanometers from any surface thereof. A layer of the surface of the separator 3 denotes a scope from any surface thereof to the depth analyzable by XPS. In the working example, use was made of an XPS machine Quantera SXM manufactured by ULVAC-PHI, Inc. In the analysis, the used X-ray was a mono-colored AlK$\alpha$ ray, and the diameter of the X-ray was set to 200 nm. The emitted-out angle thereof was set to 45°. Neutralizing guns used therein were electrons and argon ions.

Figure 5:
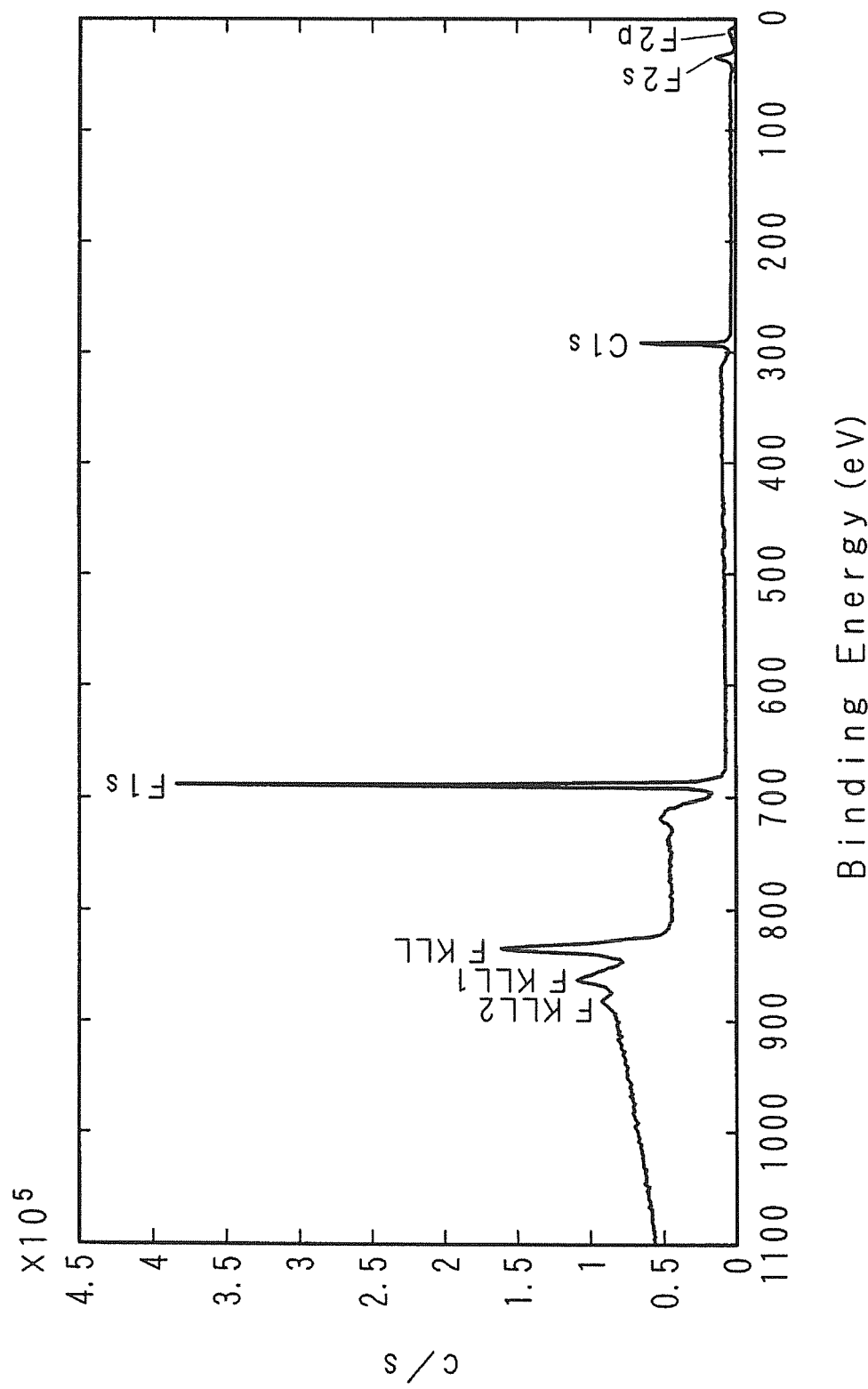
FIG. 5 is a characteristic chart showing an example of an XPS spectrum.
Figure 6:
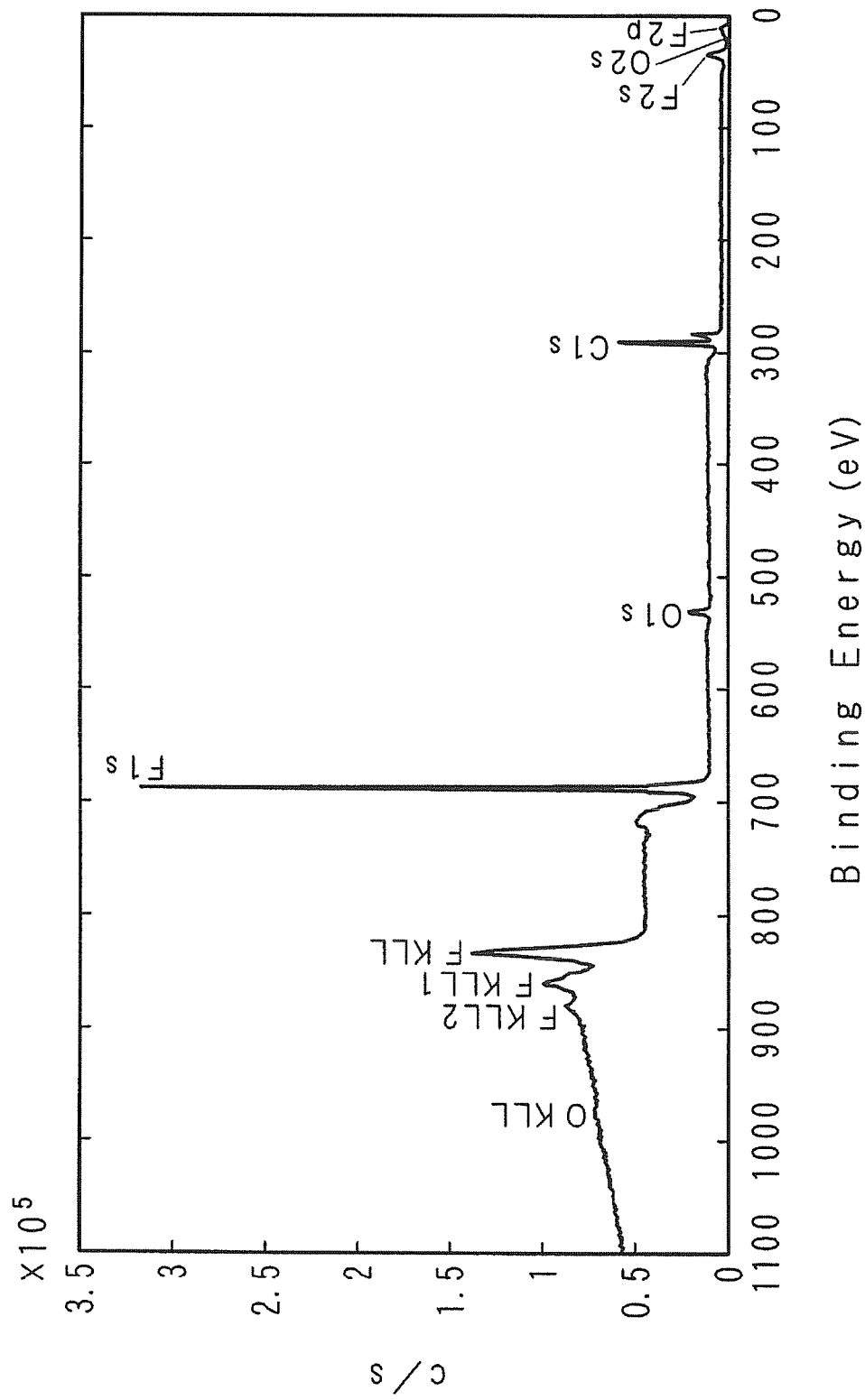
FIG. 6 is a characteristic chart showing an example of an XPS spectrum.

FIG. 5 and FIG. 6 are characteristic charts showing examples of an XPS spectrum. In the transverse axis of each of the graphs represents binding energy, the unit of which is electron voltage (eV), and the vertical axis of the graphs represents the detected intensity of photoelectrons that corresponds to each of the binding energy values, the unit of the intensity being c/s (counts per second). Peaks in each of the XPS spectra denote that a specific element is present in a specific electron state. From the XPS spectrum, the elemental ratio of each element can be gained. FIG. 5 shows results obtained by analyzing, by XPS, a PTFE sheet 31 before being impregnated with water and irradiated with UVs. The spectrum contains peaks resulting from F atoms that are in various electron states. In FIG. 5, a peak near 290 eV, to which C1s is attached, is a peak resulting from C in the PTFE sheet 31. FIG. 6 shows results obtained by analyzing, by XPS, one of the separator species 3 produced by irradiating the PTFE sheet 31 with UVs. In FIG. 6, a peak to which O1s is attached grows to be larger than in FIG. 5. In FIG. 6, a peak to which O1s is attached is a peak resulting from O. Thus, it is understood that OH groups are present in the surface of the separator 3. In FIG. 6, a peak near 290 eV, to which C1s is attached, is changed from that in FIG. 5.

Figure 7:
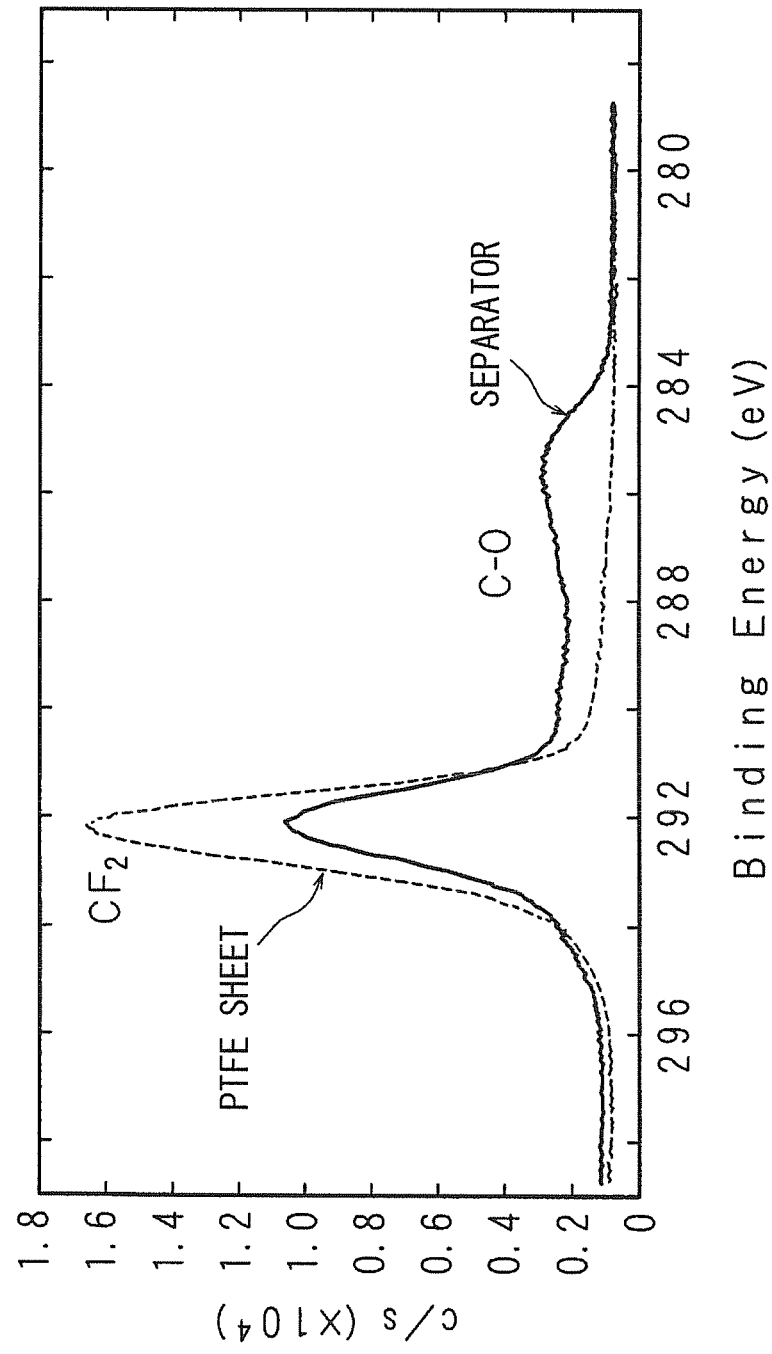
FIG. 7 is a characteristic chart obtained by enlarging XPS spectra obtained from a PTFE sheet before being impregnated with water and irradiated with UVs, and a separator.

FIG. 7 is a characteristic chart obtained by enlarging the XPS spectra obtained from the PTFE sheet 31 before being impregnated with water and irradiated with the UVs, and the separator 3. FIG. 7 shows XPS spectra in which the vicinity of a point having a binding energy of 292 eV is enlarged, and a broken line represents the XPS spectrum obtained from the PTFE sheet 31 before being impregnated with water and irradiated with the UVs, and a solid line represents the XPS spectrum from the separator 3. The binding energies of bonds concerned with C contained in PTFE are as follows: the binding energy of each of C—C and C—H is 285 eV; that of C—O 287 eV; that of C=O 289 eV; and that of $CF_2$ 292 eV. As shown in FIG. 7, in the XPS spectrum obtained from the separator 3, the intensity of the peak resulting from $CF_2$ turns lower and the respective intensities of the peaks resulting from C—O and C=O turn larger than in the XPS spectrum obtained from the PTFE sheet 31 before being impregnated with water and irradiated with the UVs. It is evident that there is caused a reaction as illustrated in FIG. 4 for substituting the F groups bonded to C with oxygen-containing hydrophilic groups such as OH groups.

In the working example, another examination was made about the wettability of a separator 3 to a molten salt by making an impregnation test thereof to a molten salt in a molten state. Specifically, a separator 3 having a size 3 cm square was formed, and the separator 3 was floated in Na-KFSA heated to 80° C. to be molten. A measurement was then made about the period until all surfaces of the separator 3 were impregnated with Na-KFSA so that the separator 3 sank.

In the working example, the separator 3 was sandwiched between a positive electrode 1 and a negative electrode 2. While the resistance between the positive and negative electrodes was measured, a pressure was applied across the positive and negative electrodes. The pressure was gradually increased to measure the short circuit pressure, which was the pressure when the positive electrode 1 and the negative electrode 2 were short-circuited therebetween. When a pressure equal to or more than the short circuit pressure is applied to the inside of the molten salt battery in the thickness direction of the separator 3, the positive electrode 1 and the negative electrode 2 are short-circuited therebetween in the molten salt battery. As the short circuit pressure of the separator 3 is smaller, the short circuit is more easily generated in the molten salt battery. As the short circuit pressure is larger, the short circuit is less easily generated. The used positive electrode 1 was a positive electrode 1 having a size of 3 cm square and formed by use of an Al Celmet as a current collector 11 of the positive electrode, and $NaCrO_2$ as a positive electrode active material, and the used negative electrode 2 was a negative electrode 2 having a size of 3 cm square and made of an Al foil plated with Sn. The increase in the pressure applied to the separator, and the measurement were made by use of an autograph. The short circuit pressure adopted was a pressure applied when the resistance between the positive and negative electrodes turned to 1 kΩ or less.

FIG. 8 is a table showing comparative results between elemental ratios in the surface layer of the separator 3, and the strength of the separator 3 as well as the wettability of the separator 3 to the molten salt. In FIG. 8 are shown the wettability of the separator 3 to the molten salt, the short circuit pressure thereof, the elemental ratio of F in the surface layer of the separator 3, and the elemental ratio of O in the surface layer of the separator 3, these values being each associated with the period for radiating the UVs to the PTFE sheet 31. When the UV radiating period is 0 minute, the separator 3 is the PTFE sheet 31 before being impregnated with water and irradiated with the UVs. The elemental ratio of O is 0.1 atomic percent; thus, it is evident that O is hardly present so that hydrophilic groups such as OH groups are hardly exposed to the surface. The molten salt is not impregnated into the entire surfaces even when time elapses. Thus, it is evident that the PTFE sheet 31 before being impregnated with water and irradiated with the UVs does not have wettability at all to the molten salt.

When the UV radiating period is 5 minutes or more, as the period is longer, in general, the elemental ratio of O is increased, that of F is decreased, the short circuit pressure is decreased and the period up to the impregnation of the separator 3 with the molten salt battery is shortened. Accordingly, the adjustment of the UV radiating period makes it possible to adjust the irradiance of the UVs to the PTFE sheet 31 to adjust the elemental ratio of O in the surface layer and the quantity of hydrophilic groups, such as OH groups, exposed to the surface. When the UV radiating period is 5 minutes, the elemental ratio of O in the surface layer of the separator 3 is 1.1 atomic percent. Thus, it is evident that OH groups are generated in the surface. It is understood that the period up to the impregnation of the separator 3 with the molten salt is 100 seconds so that the separator is improved in wettability to the molten salt by the hydrophilic groups, such as the OH groups, exposed to the surface. When a period of about 100 seconds is spent for the impregnation, it is possible that after the impregnation of the PTFE sheet 31 with the molten salt, the resultant is used as the separator 3 of a molten salt battery. The short circuit pressure is $8 \times 10^6$ Pa. As illustrated in FIG. 8, in order to use the PTFE sheet 31 impregnated with the molten salt as the separator 3 of a molten salt battery, it is necessary that the elemental ratio of O in the surface layer is 1 atomic percent or more. If the elemental ratio of O in the surface layer is less than 1 atomic percent, the period for impregnating the produced separator 3 with the molten salt exceeds 100 seconds. Thus, it is unpractical that the resultant is used as the separator 3 of a molten salt battery. It is therefore necessary to adjust the irradiance of the UVs to set the elemental ratio of O in the surface layer of the separator 3 to 1 atomic percent or more.

When the UV radiating period is 8 minutes, the elemental ratio of O in the surface layer of the separator 3 is 3.3 atomic percent. Thus, it is evident that OH groups are increased. The period up to the impregnation of the separator 3 with the molten salt is 5 seconds. Thus, it is easy to impregnate the PTFE sheet 31 with the molten salt and use the resultant as the separator 3 of a molten salt battery. In the working example, the short circuit pressure is $9 \times 10^6$ Pa. When the UV radiating period is 10 minutes, the elemental ratio of O in the surface layer of the separator 3 is 6.1 atomic percent. Thus, it is evident that OH groups are more increased. The period up to the impregnation of the separator 3 with the molten salt is 3 seconds. Thus, it is easier to impregnate the PTFE sheet 31 with the molten salt and use the resultant as the separator 3 of a molten salt battery. The short circuit pressure is $6 \times 10^6$ Pa. Thus, the pressure is lower than that in samples wherein the elemental ratio of O is lower.

When the UV radiating period is 20 minutes, the elemental ratio of O in the surface layer of the separator 3 is 15.4 atomic percent so that OH groups are further increased. However, the period up to the impregnation of the separator 3 with the molten salt is 3 seconds. Thus, it is understood that the improvement of the wettability to the molten salt reaches to a limit. Even when the hydrophilic groups, such as the OH groups, in the separator 3 surface are further increased, it is evident that an advantage is hardly produced to improve the wettability to the molten salt. The short circuit pressure is lowered down to $1 \times 10^6$ Pa. In the state that the short circuit pressure is $1 \times 10^6$ Pa or less, there is enhanced a risk that when the pressure applied to the separator 3 in the thickness direction thereof is increased, for example, when the positive electrode 1 or the negative electrode 2 is swelled by charging and discharging the battery, the pressure exceeds the short circuit pressure so that the positive electrode 1 and the negative electrode 2 are short-circuited therebetween. Accordingly, when the elemental ratio of O in the surface layer of the separator 3 exceeds 15 atomic percent, it is unpractical to use the produced separator 3 as a separator 3 of a molten salt battery. Thus, it is necessary in the present invention to restrict the irradiance of the UVs to set the elemental ratio of O in the surface layer of the separator 3 to 15 atomic percent or less and set the short circuit pressure to $1 \times 10^6$ Pa or more, thereby restricting the amount of the F groups in the PTFE sheet 31 to be substituted with hydrophilic groups such as OH groups.

As described in detail above, in the present embodiment, the raw material of the separator 3 is rendered PTFE. F groups exposed to the surface are substituted with OH groups to set the elemental ratio of oxygen present in the surface layer of the PTFE sheet 31 into the range of 1 atomic percent or more and 15 atomic percent or less, thereby improving the wettability of the PTFE sheet 31 to a molten salt. Since the wettability to the molten salt is improved, the PTFE sheet 31 can be impregnated with the molten salt to make it possible to use the impregnated sheet as the separator 3 of a molten salt battery. In the present invention, the PTFE sheet 31 is impregnated with water, and then irradiated with UVs, whereby the F groups exposed to the surface of the PTFE sheet 31 can easily be substituted with OH groups. Moreover, by adjusting the irradiance of the UVs, the elemental ratio of O present in the surface layer of the PTFE sheet 31 can easily be adjusted. Furthermore, in the present invention, the substitution amount of the OH group is restricted to make the short circuit pressure of the separator 3 to more than $1 \times 10^6$ Pa, whereby the PTFE sheet 31 can keep a strength permitting the sheet to be actually used as the separator 3 of a molten salt battery. Originally, PTFE has a very good heat resistance such that PTFE is usable at high temperatures not lower than the melting point of the molten salt. Thus, the separator 3 containing, as a raw material thereof, PTFE comes to be usable in a molten salt battery.

The separator 3 containing, as a raw material thereof, PTFE is less easily broken than conventional separators wherein a glass nonwoven fabric is used. Accordingly, the molten salt battery of the present invention, wherein the separator 3 contains as a raw material thereof PTFE, is lower in the risk of being short-circuited to be safer than conventional molten salt batteries wherein a glass nonwoven fabric is used for the separator. Additionally, the separator 3 is less easily broken and is high in the capability of preventing the molten salt battery from being short-circuited; thus, the thickness thereof can be made smaller than that of conventional separators wherein a glass nonwoven fabric is used. Specifically, when the separator is compared with a conventional separator having a thickness of 200 μm, the separator 3 can be made into a thickness of 20 to 100 μm while the separator 3 keeps performance equivalent to those of the conventional separator. When the thickness of the separator 3 is made small, the molten salt battery can be lowered in internal resistance to give a high power.

In the above-mentioned embodiment, as the method for adjusting the irradiance of the UVs, the method of adjusting the UV radiating period has been described. In the present invention, however, the irradiance of the UVs may be adjusted by a different method. For example, the luminous intensity of the UVs is adjusted or the distance from the UV radiating source to the PTFE sheet 31 is adjusted, whereby the irradiance of the UVs may be adjusted.

In the embodiment, as the method for giving hydrophilicity to the PTFE sheet 31, the manner of radiating UVs has been described. In the present invention, however, the method is not limited thereto, and hydrophilicity may be given to the PTFE sheet 31 by a different method. In the present invention, the manner is, for example, a manner of forming a layer made from polyvinyl alcohol (PVA) onto each surface of the PTFE sheet 31 to give hydrophilicity to the PTFE sheet 31. PVA is a substance having hydrophilic groups to be high in hydrophilicity. Thus, the formation of the PVA layer to the surface of the PTFE sheet 31 gives hydrophilicity to the PTFE sheet 31. Specifically, by immersing the PTFE sheet 31 in PVA, the PVA layer is formed onto the surface of the PTFE sheet 31. The inventors' experiments have demonstrated that a resin showing hydrophilicity given by forming a PVA layer on each surface thereof is improved in wettability to a molten salt. Since the separator 3 produced by forming a PVA layer onto the PTFE sheet 31 can be impregnated with a molten salt, the separator 3 is usable in a molten salt battery. After the PVA layer is formed, it is allowable to crosslink the PVA by chemical crosslinking with a crosslinking agent, radiation crosslinking through ionizing radiation, or some other method. When the PVA is crosslinked, the adhesive power between the PTFE and the PVA layer is improved. Thus, a more favorable separator 3 is yielded.

The method for giving hydrophilicity to the PTFE sheet 31 may be any plasma treatment of the PTFE sheet 31. For example, a high-frequency voltage is applied to a mixed gas of nitrogen gas and hydrogen gas, and then the PTFE sheet 31 is exposed to the generated plasma to conduct a plasma treatment. The following has been verified: when the PTFE sheet 31 is subjected to a plasma treatment for 5 minutes or longer, the contact angle of water to the PTFE sheet 31 is changed from a value corresponding to a super water-repellency state to about 40°; in this way, hydrophilicity is given to the PTFE sheet 31 so that the PTFE sheet 31 is improved in wettability to a molten salt. Similarly, it has been verified that a plasma treatment by use of argon gas or oxygen gas gives hydrophilicity to the PTFE sheet 31 to improve the PTFE sheet 31 in wettability to a molten salt. The surface of the PTFE sheet 31 subjected to the plasma treatment was analyzed. As a result, in the surface subjected to the plasma treatment, C—F bonds were reduced from those in the surface before the plasma treatment. Thus, it is presumed that the decrease in the C—F bonds in the surface contributes to an improvement in the wettability of the molten salt. Since the separator 3 produced by subjecting the PTFE sheet 31 to a plasma treatment can be impregnated with a molten salt, the separator 3 can be used in a molten salt battery. The separator 3 produced by a method other than the UV radiation also produces the same advantageous effects as the separator 3 produced by the UV radiation.

In the above-mentioned embodiment, an embodiment wherein the fluororesin that is the raw material of the separator is PTFE has been described. However, the present invention is not limited to this embodiment. The present invention may be carried out in an embodiment wherein the raw material of the separator 3 is a fluororesin other than PTFE. The raw material of the separator 3 is preferably a fluororesin having heat resistance of 190° C. or higher. Specific examples thereof include PFA (tetrafluoroethylene/perfluoroalkyl vinyl ether copolymer), FEP (tetrafluoroethylene/hexafluoropropylene copolymer), ETFE (tetrafluoroethylene/ethylene copolymer), PCTFE (polychlorotrifluoroethylene), ECTFE (ethylene/chlorotrifluoroethylene copolymer), and PVDF (polyvinylidene fluoride).

The present invention may be carried out in an embodiment wherein components of a molten salt, which is an electrolyte, are adjusted, thereby lowering the melting point of the molten salt to lower the operating temperature of the molten salt battery, and the raw material of the separator 3 is a resin having a heat-resistant temperature lower than that of any fluororesin. For example, in the molten salt battery having an operating temperature of 80° C. or higher, the raw material of the separator 3 may be polypropylene.

Furthermore, the separator 3 may be in such a form that a resin sheet which is an original member therefor is impregnated with a molten salt without giving hydrophilicity to the sheet. Specifically, a porous resin sheet is impregnated with a solvent high in affinity with the resin, such as isopropyl alcohol, ethyl acetate or acetone, and next the solvent is substituted with a molten salt, thereby impregnating the resin sheet with the molten salt. Since isopropyl alcohol has hydrophobic groups to be high in affinity with any fluororesin, polypropylene or some other resin, this solvent is easily impregnated into the resin sheet. The resin sheet impregnated with isopropyl alcohol is immersed in the molten salt, thereby substituting isopropyl alcohol in the resin sheet with the molten salt to impregnate the molten salt into the resin sheet. The separator 3 may be in the form of being impregnated with a molten salt by such a treatment.

Embodiment 2

Figure 9:
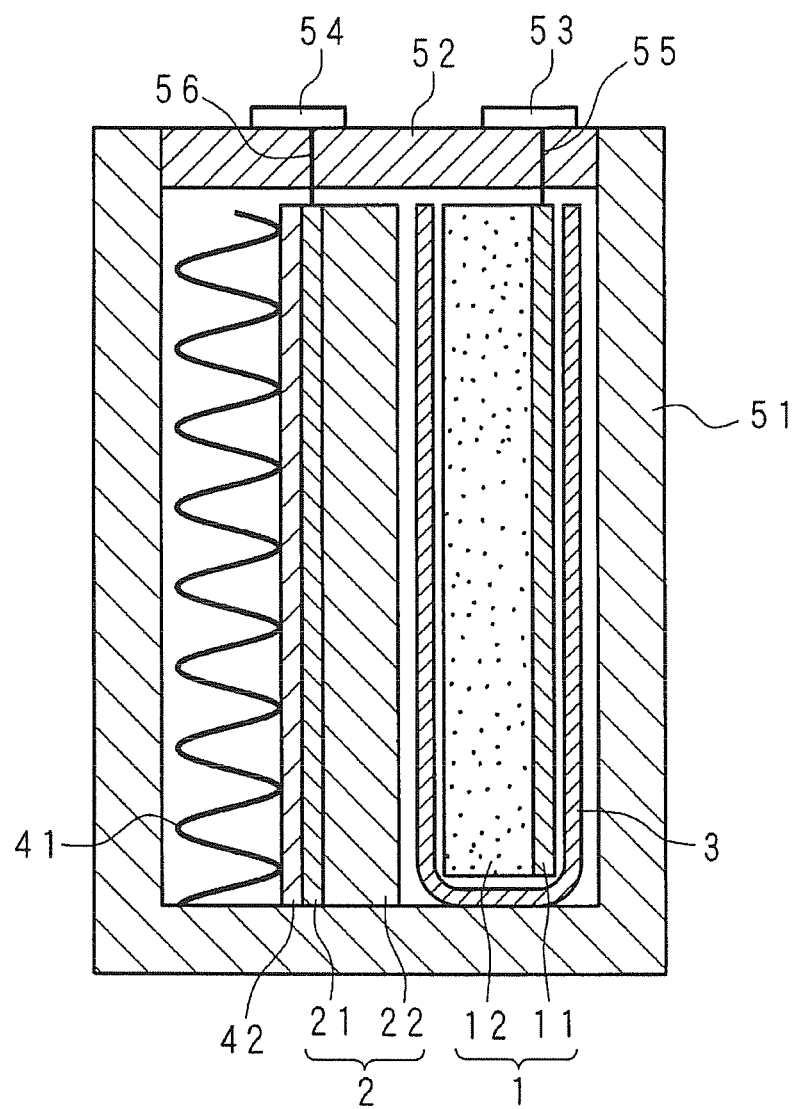
FIG. 9 is a schematic sectional view of a structural example of a molten salt battery according to Embodiment 2 of the present invention.

FIG. 9 is a schematic sectional view of a structural example of a molten salt battery according to Embodiment 2 of the present invention. In FIG. 9, the illustrated schematic sectional view is one obtained by cutting the molten salt battery vertically. In the same manner as in Embodiment 1, a separator 3 is a porous resin sheet, such as a PTFE sheet 31 to which hydrophilicity is given, and is made into a bag form. Specifically, resin sheets to which hydrophilicity is given are put onto each other, and circumferential edges of the resin sheets are joined to each other except the edges of respective single sides of the sheets, thereby producing the bag-form separator 3. For example, two PTFE sheets 31 each having hydrophilicity given by UV radiation are put onto each other, and then their circumferential edges are heated to be melted and bonded to each other, thereby producing the separator 3. A positive electrode 1 is wrapped in the bag-form separator 3 to be present in the bag-form inside thereof. The separator 3 has, at one side thereof, an opening. Through a lead wire 55 passed through the opening, a current collector 11 of the positive electrode is electrically connected to a positive electrode terminal 53. Other structural members of the molten salt battery are the same as in Embodiment 1. To members or portions corresponding to each other are attached the same reference signs, and description thereof is omitted. The separator 3 may be in the form that after the positive electrode 1 is put into the separator, the opening is sealed except a region through which the lead wire 55 is passed. After the resin sheet is made into a bag form, hydrophilicity may be given to the resin sheet.

The PTFE sheet 31, or any other porous resin sheet is higher in mechanical strength and better in workability than a glass nonwoven fabric; thus, the separator 3 can be made into the bag form. In the present embodiment, the positive electrode 1 is wrapped in the bag-form separator 3, so that the separator 3 is constantly present between the positive electrode 1 and the negative electrode 2. In a battery wherein a sheet-form separator is interposed between a positive electrode 1 and a negative electrode 2, the electrodes or the separator gets out of position because of a change in the temperature, or the deformation of the electrodes that follows the charging and discharging of the battery. Thus, short circuit may be caused. However, even when the positive electrode 1 or the negative electrode 2 gets out of position in the present embodiment, the separator 3 is constantly present between the positive electrode 1 and the negative electrode 2. Accordingly, in the molten salt battery according to the present embodiment, it does not happen that the electrode or the separator gets out of position to cause short circuit. Thus, this battery is made better in safety than any battery wherein a sheet-form separator is interposed between a positive electrode and a negative electrode. Even when a dendrite grows in the negative electrode 2, the probability that the dendrite is intercepted by the separator 3 is largely enhanced so that the battery can attain stable charge/discharge cycles.

In the embodiment, an embodiment wherein the positive electrode 1 is wrapped in the separator 3 has been described. However, the molten salt battery may be embodied in an embodiment wherein the negative electrode 2 is wrapped in the separator 3. In Embodiments 1 and 2, embodiments each having a pair of electrodes, which are the positive electrode 1 and the negative electrode 2, have been described. However, the molten salt battery of the present invention may be embodied in an embodiment wherein plural positive electrodes 1 and plural negative electrodes 2 are alternately arranged to interpose a separator 3 between any adjacent two of these electrodes.

Embodiment 3

Figure 10:
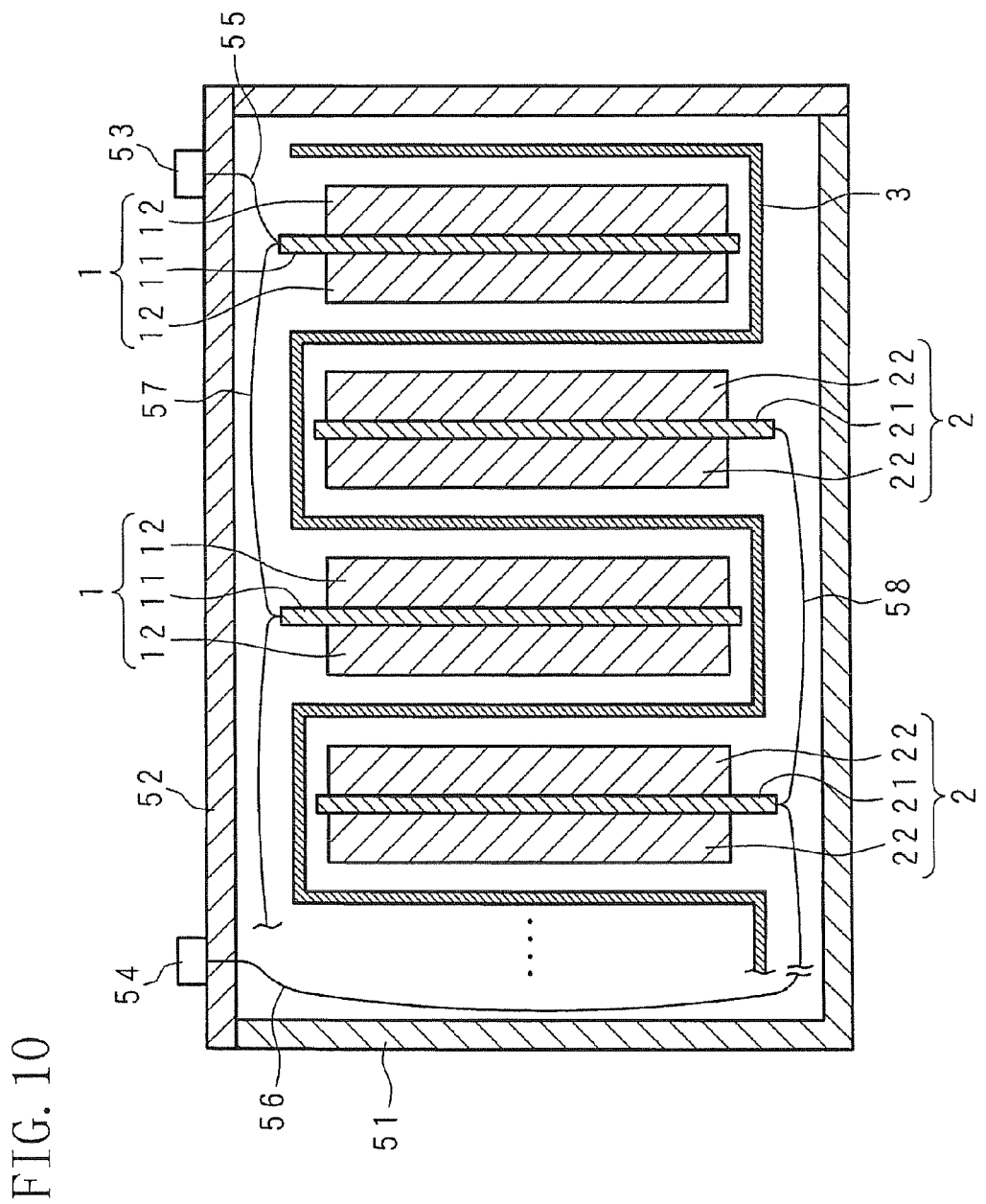
FIG. 10 is a schematic sectional view of a structural example of a molten salt battery according to Embodiment 3 of the present invention.

FIG. 10 is a schematic sectional view of a structural example of a molten salt battery according to Embodiment 3 of the present invention. In FIG. 10, the illustrated schematic sectional view is one obtained by cutting the molten salt battery vertically. The molten salt battery has positive electrodes 1 and negative electrodes 2. The positive electrodes 1 are each formed by painting a positive electrode material 12 containing a positive electrode active material onto both surfaces of a rectangular plate-form current collector 11 of the positive electrode. The negative electrodes 2 are each formed by depositing a negative electrode material 22 containing a negative electrode active material onto both surfaces of a rectangular plate-form current collector 21 of the negative electrode by plating. The plural positive electrodes 1 and the plural negative electrodes 2 are each formed into the form of a flat rectangular plate, and are alternately arranged in a battery case 51, in the form of a box having an opened upper surface, to interpose a separator 1 between any adjacent two of the electrodes. The electrodes 1 and 2 are arranged perpendicularly to the bottom surface of the battery case 51. The plural current collectors 11 of the positive electrode are connected to each other through a lead wire 57, and are further connected to a positive electrode terminal 53 through a lead wire 55. In the same manner, the plural current collectors 21 of the negative electrode are connected to each other through a lead wire 58, and are further connected to a negative electrode terminal 54 through a lead wire 56. In FIG. 10, the lead wire 57 is arranged above the electrodes, and the lead wire 58 is arranged below the electrodes. However, the lead wire 57 and the lead wire 58 may be arranged on sides of the electrodes (on the front surface side and the back surface side of the cross section in FIG. 10).

In the same manner as in Embodiments 1 and 2, the separator 3 is a porous resin sheet, such as a PTFE sheet 31, to which hydrophilicity is given, and is impregnated with a molten salt, which is an electrolyte. The separator 3 in the embodiment is in a long sheet form, and is made into the form of being folded plural times in the longitudinal direction. In the molten salt battery, the separator 3, which is a single continuous sheet, is folded plural times in the longitudinal direction, and one of the folded regions of the separator 3 is arranged between each of the positive electrodes 2 and the adjacent negative electrode 3. One end of each of the positive electrodes 1 and the negative electrodes 2 is wrapped with one of the bent regions of the separator 3, which result from the folding of the separator 3, and each of the flat regions thereof is interposed between one of the positive electrodes 1 and the adjacent negative electrode 2. In this way, the positive electrodes 1 are separated from the negative electrodes 2 by the separator 3, which is a single sheet. Each of the positive electrodes 1 and the negative electrodes 2 is sandwiched, from both surface sides thereof, between regions of the single-sheet separator 3. The plural positive electrodes 1 are arranged at one surface side of the separator 3. The plural negative electrodes 2 are arranged at the other surface side of the separator 3.

As described above, the molten salt battery according to the present embodiment has the positive electrodes 1 and the negative electrodes 2, which are alternately arranged, and has the continuous-sheet-form separator 3 folded plural times. Each of the folded portions of the separator 3 is interposed between any adjacent two of the positive electrodes 1 and the negative electrodes 2. Any conventional separator using a glass nonwoven fabric is poor in workability; thus, when the separator is folded or bent, the separator is easily broken. For this reason, the separator cannot be made into a form of being folded plural times. About the molten salt battery of the embodiment, the positive electrodes 1 and the negative electrodes 2 are alternately arranged therein; thus, the battery operates equivalently to a circuit wherein plural batteries are connected to each other in parallel. Accordingly, the molten salt battery according to the embodiment has a larger capacity than a battery having a single positive electrode and a single negative electrode. Moreover, in the embodiment, about each of the positive electrodes 1 and the negative electrodes 2, both surfaces thereof are sandwiched between regions of the separator 3; thus, even when the electrodes or the separator 3 gets out of position, the possibility that the separator 3 is present between the positive electrodes 1 and the negative electrodes 2 is large so that the possibility that short circuit is caused is small. Accordingly, the molten salt battery according to the present embodiment is high in safety.

In the embodiment, any two of all the positive electrode materials 12 are formed on both surfaces of each of the current collectors 11 of the positive electrode, respectively, and any two of all the negative electrode materials 22 are formed on both surfaces of each of the current collectors 21 of the negative electrode, respectively. However, the positive electrode 1 or the negative electrode 2 positioned at each of both ends of the battery may be in the form that one of the positive electrode materials 12 or one of the negative electrode materials 22 is formed on a single side surface thereof. It is allowable that the separator 3 is not folded plural times in the vertical direction, but folded plural times in the horizontal direction. The plural positive electrodes 1, as well as the plural negative electrodes 2, may be connected to each other through means other than the lead wire.

The structures of the molten salt batteries described as Embodiments 1 to 3 are examples; thus, the structure of the molten salt battery of the present invention may be any other structure as far as the structure is a structure wherein a separator 3 obtained by impregnating with the molten salt a porous resin resistant against a molten salt is interposed between a positive electrode 1 and a negative electrode 2. For example, the molten salt battery may be in an embodiment wherein a positive electrode 1 and a negative electrode 2 are laminated onto each other in the vertical direction. The shape of the molten salt battery is not limited to any rectangular parallelepiped form, and may be any other shape, such as a cylindrical form. The embodiments disclosed herein are mere examples in all respects, and should be interpreted not to be restrictive. The scope of the present invention is specified not by the above-mentioned meaning but by the claims, and is intended to include all variations each having a meaning and a scope equivalent to those of the claims.

REFERENCE SIGN LIST

1: positive electrode
11: current collector of positive electrode
12: positive electrode material
2: negative electrode
21: current collector of negative electrode
22: negative electrode material
3: separator
31: PTFE sheet (fluororesin sheet)
63: low-pressure mercury lamp

The invention claimed is:
1. A separator in a sheet form for separating paired electrodes from each other in a molten salt battery using a molten salt as an electrolyte, the separator comprising a porous resin sheet that is resistant against the molten salt, wherein a surface layer of the resin sheet includes:
at least one of F group and H group; and
OH group that imparts hydrophilicity to the separator and contains oxygen to thereby provide the surface layer with elemental ratio of oxygen range from 1 atomic percent to maintain wettability for the molten salt to 15 atomic percent to maintain the strength of the separator.

2. The separator according to claim 1, wherein the molten salt contains at least one of NaFSA, NaTFSA and NaFTA, wherein FSA is bisfluorosulfonylamide, TFSA is bistrifluoromethylsulfonylamide, and FTA is fluorotrifluoromethylsulfonylamide.

3. The separator according to claim 1, wherein when the separator is sandwiched between the paired electrodes and a pressure is applied to the separator in the thickness direction of the sheet until the paired electrodes are short-circuited, the pressure is $1 \times 10^6$ Pa or more at the time of the short circuit.

4. The separator according to claim 1, wherein the resin is a fluororesin or polypropylene, and a layer comprising polyvinyl alcohol is formed over each surface of the separator.

5. The separator according to claim 1, which is partially opened to be made into a bag form.

6. A method for producing the separator according to claim 1, the method comprising the steps of:

preparing the porous resin sheet; and providing hydrophilicity to the porous resin sheet.

7. The method for producing a separator according to claim 6, wherein the resin sheet is a fluororesin sheet, in the state that the fluororesin sheet is impregnated with water, the fluororesin sheet is irradiated with ultraviolet rays having an energy not less than an energy necessary for cleaving C-F bonds in the fluororesin to substitute F groups exposed to each surface of the fluororesin sheet with oxygen-containing groups, thereby setting the elemental ratio of oxygen present in a layer of the surface of the fluororesin sheet into the range of 1 atomic percent or more and 15 atomic percent or less.

8. The method for producing a separator according to claim 7, wherein before the fluororesin sheet is impregnated with the water, the fluororesin sheet is immersed in a hydrophilic organic solvent.

9. The method for producing a separator according to claim 7, wherein the amount of the F groups to be substituted with the oxygen-containing groups is adjusted in such a manner that when the separator is sandwiched between the paired electrodes and a pressure is applied to the separator in the thickness direction of the sheet until the paired electrodes are short-circuited, the pressure turns to $1 \times 10^6$ Pa or more at the time of the short circuit.

10. The method for producing a separator according to claim 6, wherein a layer comprising polyvinyl alcohol is formed over the surface of the resin sheet.

11. The method for producing a separator according to claim 6, wherein the resin is polypropylene.

12. The method for producing a separator according claim 6, wherein the sheet to which hydrophilicity is given, and a sheet entirely equivalent thereto are put onto each other, and their circumferential edges are joined to each other except some portions, thereby forming the sheets into a bag form.

13. A method for producing a molten salt battery, comprising: fabricating the molten salt battery in the state that electrodes thereof are separated from each other by a separator produced by the method for producing a separator as recited claim 6.

14. The method for producing a separator according to claim 8, wherein the amount of the F groups to be substituted with the oxygen-containing groups is adjusted in such a manner that when the separator is sandwiched between the paired electrodes and a pressure is applied to the separator in the thickness direction of the sheet until the paired electrodes are short-circuited, the pressure turns to $1 \times 10^6$ Pa or more at the time of the short circuit.

15. The method for producing a separator according to claim 10, wherein the resin is polypropylene.

16. The method for producing a separator according to claim 7, wherein the sheet to which hydrophilicity is given, and a sheet entirely equivalent thereto are put onto each other, and their circumferential edges are joined to each other except some portions, thereby forming the sheets into a bag form.

17. A molten salt battery using a molten salt as an electrolyte, the battery comprising a separator impregnated with the molten salt, wherein the separator is in a sheet form for separating paired electrodes from each other in the molten salt battery, the separator comprising a porous resin sheet that is resistant against the molten salt, wherein a surface layer of the resin sheet includes:

at least one of F group and H group; and

OH group that maintains hydrophilicity to the separator and contains oxygen to thereby provide the surface layer with elemental ratio of oxygen range from 1 atomic percent to maintain wettability for the molten salt to 15 atomic percent to maintain the strength of the separator.

18. The molten salt battery according to claim 17, wherein the separator is partially opened to be made into a bag form.

19. The molten salt battery according to claim 17, comprising plural positive electrodes and negative electrodes each made into a plate form, the separator being a continuous separator folded plural times, and the positive electrodes and the negative electrodes being alternately arranged to sandwich a folded portion of the separator between any adjacent two of the positive electrodes and the negative electrodes.

* * * * *